United States Patent [19]

Sauber

[11] Patent Number: 5,007,654
[45] Date of Patent: Apr. 16, 1991

[54] TRUCK STEP

[76] Inventor: Charles J. Sauber, 10 N. Sauber Rd., Virgil, Ill. 60182

[21] Appl. No.: 373,250

[22] Filed: Jun. 29, 1989

[51] Int. Cl.$^5$ .............................................. B60R 3/02
[52] U.S. Cl. ...................................... 280/166; 182/89
[58] Field of Search .................... 280/166, 164.1, 163; 182/86, 89, 91, 127, 164

[56] References Cited

U.S. PATENT DOCUMENTS

| | | | |
|---|---|---|---|
| 2,653,036 | 9/1953 | Creel | 280/166 |
| 2,678,832 | 5/1984 | Wright | 182/89 |
| 2,702,195 | 2/1955 | Merrill | 182/89 |
| 3,068,958 | 12/1962 | McCann | 182/89 |
| 3,854,752 | 12/1974 | Flint et al. | 280/166 |
| 4,274,648 | 6/1981 | Robins | 182/91 |

Primary Examiner—David M. Mitchell
Attorney, Agent, or Firm—Leydig, Voit & Mayer

[57] ABSTRACT

A vehicle step assembly for mounting to a truck structure permits forward and rearward swinging upon encountering obstacles and comprises an inverted U-shaped support bracket which can be affixed to a vehicle and a platform assembly which is rotatable about a shiftable axis interconnected with the support bracket. The support bracket also provides rotation guide channels for directing rotation and includes detents to vertically secure against rotation of the step in use or while the vehicle is in motion. The step assembly includes a horizontal cross member which rotates freely within cam shaped apertures in the support assembly and allows the rotational axis of the platform assembly to shift. Vertical support members fixedly mounted to the expanded metal step platform include guide pins which track the support guide channels and direct the platform assembly between its rigid vertical position and forward or rearward rotated positions.

5 Claims, 4 Drawing Sheets

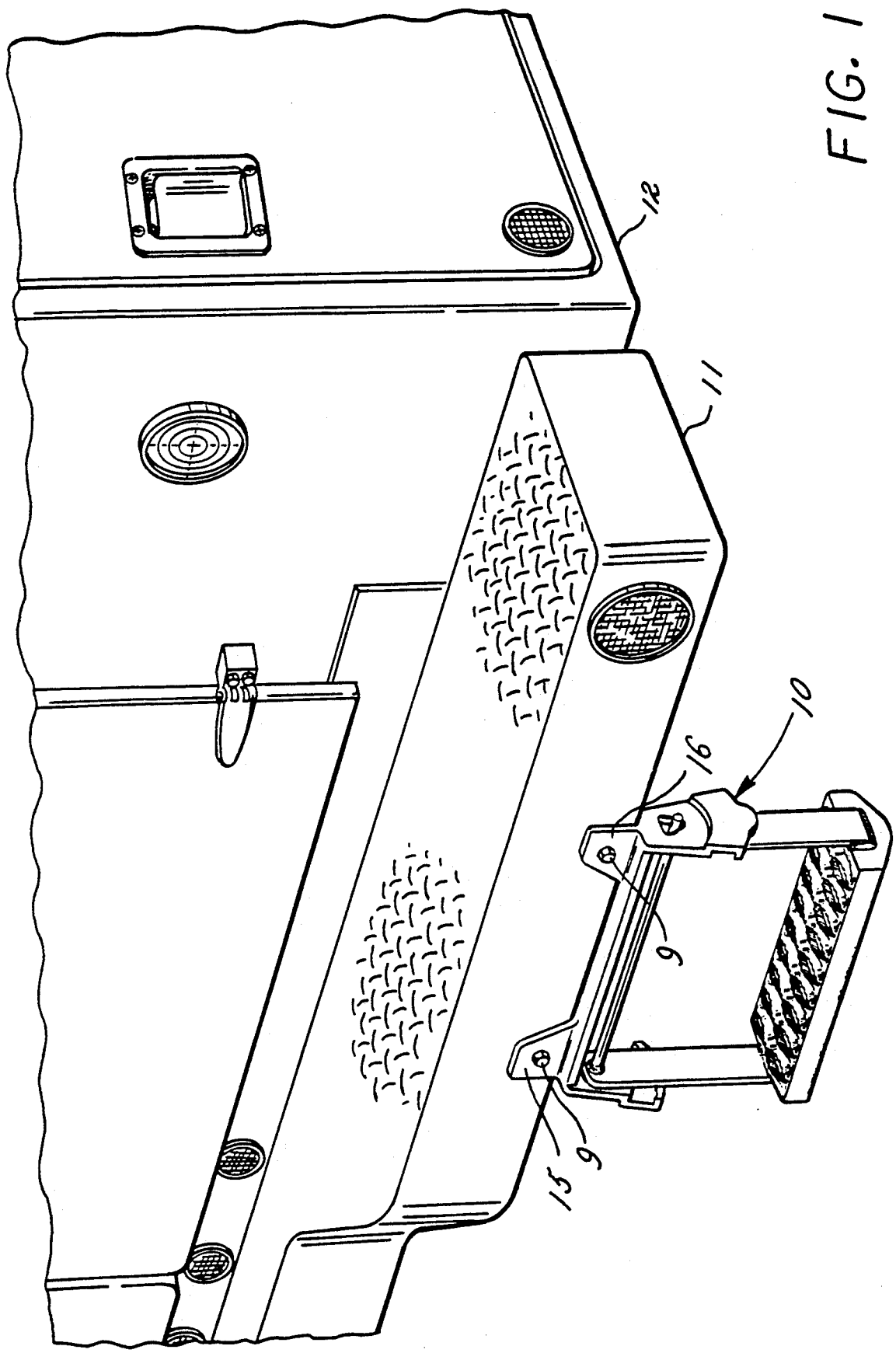

TRUCK STEP

FIELD OF THE INVENTION

This invention relates generally to vehicle steps and more particularly, to hanging platform type steps positioned at the rear of truck bodies to assist in climbing up onto high beds of such vehicles.

BACKGROUND OF THE INVENTION

Stepping platforms are typically provided for high beds of trucks to assist in safely mounting and dismounting of vehicles. Presently, most vehicle steps are fixed to the body or frame of a vehicle and project perpendicularly downward from the flat bed rear entry way. Examples of the present vehicle steps can be seen, for example, in rigid or cable type steps used with step-bumpers of current truck configurations.

However, on uneven or sloping terrain, present forms of vehicle steps comport with the orientation of the vehicle. If the vehicle is driven over bumpy uneven terrain or in off-road areas where rocks, ditches or other obstacles are present, the rigidly mounted hanging step can be bent or broken off the vehicle. Removable or hinged steps do not solve the problems because the steps may either be lost or inaccessible when needed. Also, it is necessary for the steps to be rigid when used for mounting by a person and swinging one way or the other will not provide protection for the hanging step in both forward and reverse movements of the vehicle. Cable steps likewise either are stiff enough to provide safe and firm support which still gives rise to downtime and maintenance problems, or they are too flexible and sacrifice operator safety.

OBJECTS AND SUMMARY OF THE INVENTION

It is a primary object of this invention to provide a vehicle step which is normally rigid for mounting use by a person, but when the vehicle is driven over uneven or obstacle ridden terrain, the step is capable of being deflected out of the way to avoid bending or breaking off of the vehicle.

Another object of this invention is to provide a vehicle step which presents a stepping platform with enhanced safety characteristics.

A further object is to provide a vehicle step of the foregoing type which is secured against free swinging rotation while the vehicle upon which it is mounted is in transit.

An additional object is to provide an intermediate step between the ground and the vehicle upon which the invention is mounted to facilitate ease and safety in mounting and dismounting the vehicle.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a perspective drawing showing the invention mounted on the rear of a vehicle positioned on level ground;

Figure 3:
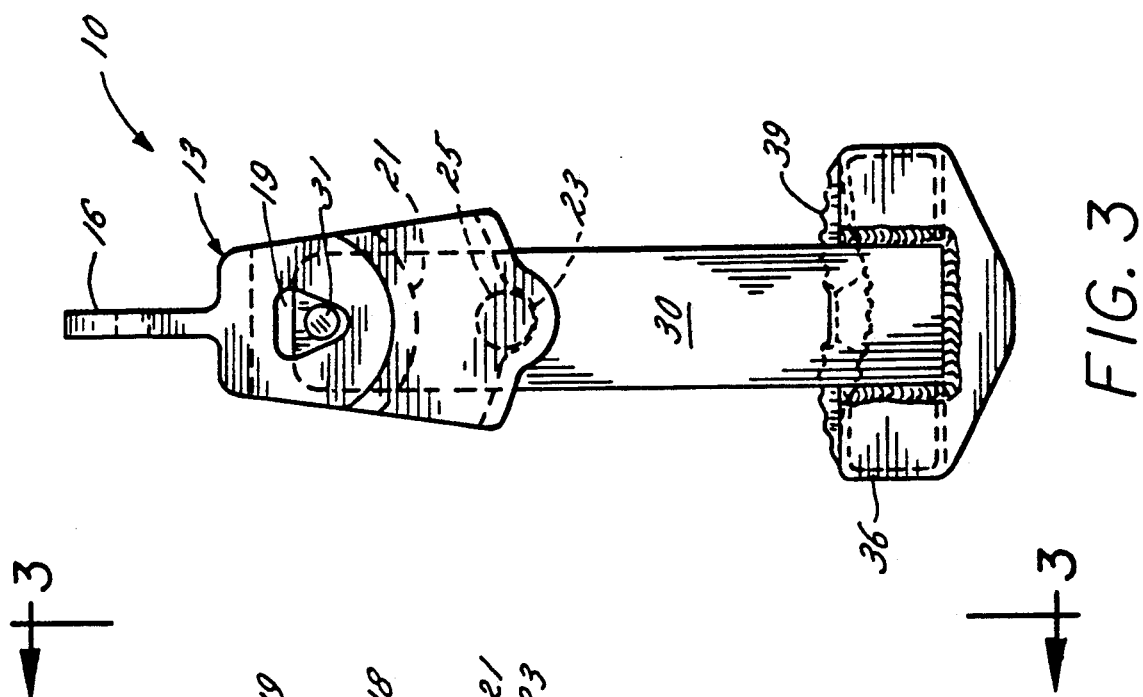
FIG. 3 is a side view of the vehicle step invention shown in FIG. 2.

While the invention has been described in connection with a preferred embodiment, it will be understood that I do not intend to be limited to the particular embodiment shown but intend, on the contrary, to cover the various alternatives ad equivalent constructions included within the spirit and scope of the appended claims.

DESCRIPTION OF THE PREFERRED EMBODIMENT

With reference to FIG. 1, the truck step assembly of this invention, generally designated 10, is shown attached to a vehicle structure 11 such as the frame or bumper of a truck 12. The truck step assembly 10 is mounted to the truck structure 11 by mounting flanges or ears 15, 16 using securing means 9 such as nuts and bolts, welding, or the like.

Figure 2:
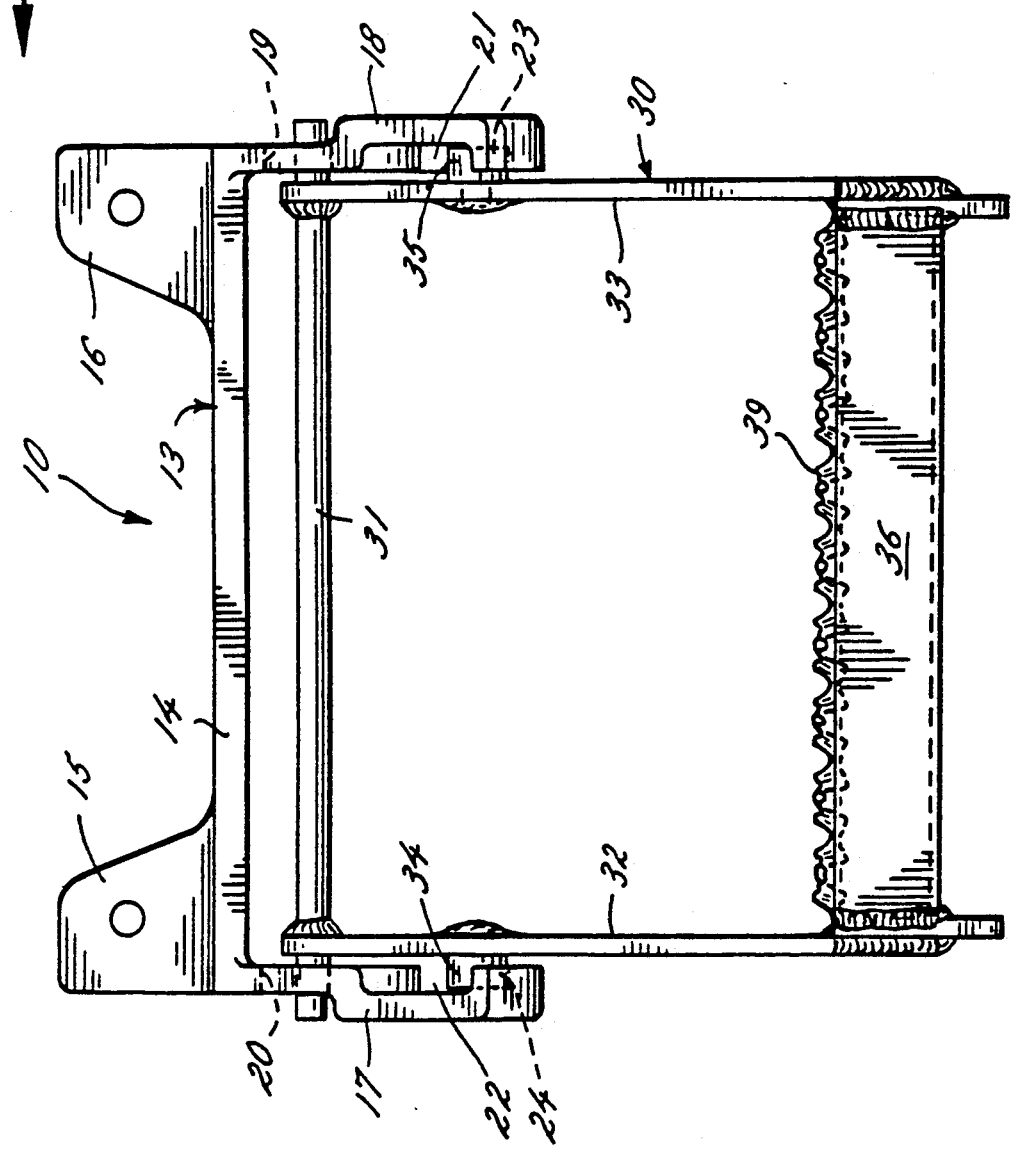
FIG. 2 is a front view of the invention showing the rigid use orientation of the vehicle step invention such as when the vehicle upon which it is mounted is positioned on level terrain.

Referring to FIG. 2, the truck step 10 is comprised of a step support bracket 13 and a step assembly 30. The step support bracket 13 is of an inverted U-shape, having a horizontal cross member 14, which receives flanges 15, 16. On opposite ends of the horizontal cross member 14 are downwardly extending vertical step support arms 17, 18. Each vertical support arm 17, 18 provides a triangular cam-shaped aperture 19, 20 and a generally V-shaped guide channel 21, 22. Each guide channel 21, 22 provides a central detent 23, 24 which receives pin members projecting from the step assembly 30 for limiting rotation while the vehicle is on level ground or during transit.

Figure 4:
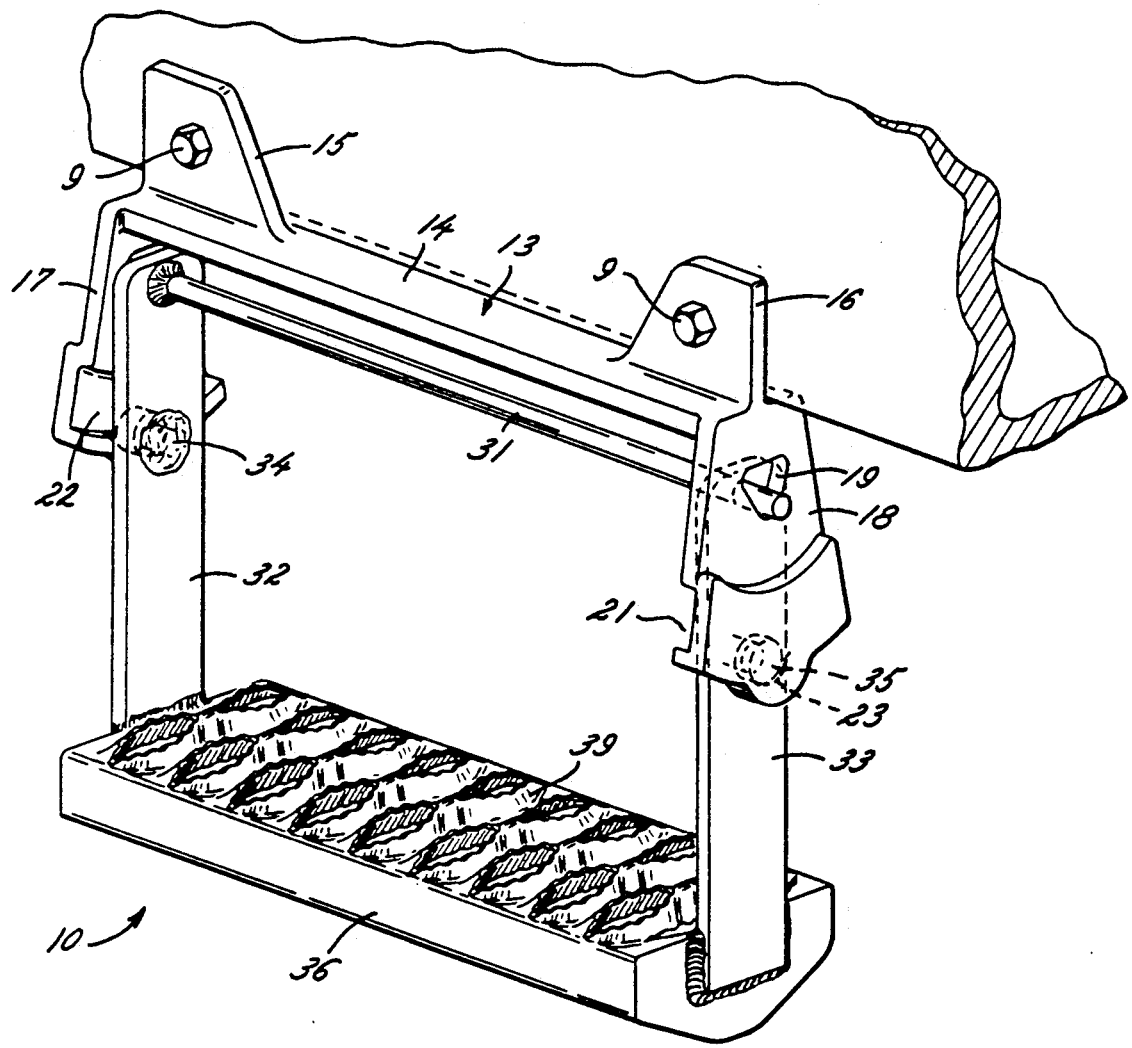
FIG. 4 is a perspective view of the vehicle step invention mounted on a vehicle and positioned in the vertical use position.

Referring to FIG. 4, the step assembly, generally designated 30, is comprised of a horizontal axial rod or cross member 31 which separates and interconnects with left and right downwardly extending lateral step support arms 32, 33 and step platform 36 with textured surface 39.

The ends of the horizontal axial cross member 31 extend through and beyond the lateral support arms 32, 33 to provide an axis of rotation. Each lateral step support arm 32, 33 includes an outwardly extending rotational guide pin 34, 35 which tracks within the rotational guide channels 21, 22 of the step support bracket 13. The rotational guide pins 34, 35, when the step support bracket 13 and the step assembly 30 are in vertical alignment, seat in the stability detents 23, 24 to secure the step assembly 30 from rotation.

The step platform 36 is attached between the lateral step support arms 32, 33 in this case by welding. The textured surface 39, in this case is provided by an expanded metal structure including perforations having serrated edges. This type of construction provides a safer stepping surface in order to minimize slipping and loss of footing when mounting or dismounting the vehicle. Additionally, the step platform has rounded edges 37, 38 which precludes the truck step 10 from digging into the ground on uneven terrain.

While the operation of the truck step 10 will be apparent in view of the foregoing description, it may nevertheless be helpful to review the operation as follows. The truck step 10 in its completely assembled configuration is here mounted to the step-bumper of vehicle 12 by affixing mounting flanges 15, 16 using securing means 9 such as nuts and bolts, welding or any other suitable means. When the vehicle is positioned on level ground, the rotational guide pins 34, 35 on the otherwise freely rotating step assembly 30 seat in the stability detents 23, 24 and stabilize movement of the step assembly 30 during travel.

To enable the step assembly 30 to rotate when the vehicle upon which the truck step 10 is mounted travels over irregular or ditch ridden terrain, upward movement or lifting of the step assembly 30 will disengage the rotational guide pins 34, 35 from the stability detents 23, 24, thereby allowing rotation of the step assembly 30 in either the forward or rearward directions.

Figure 5:
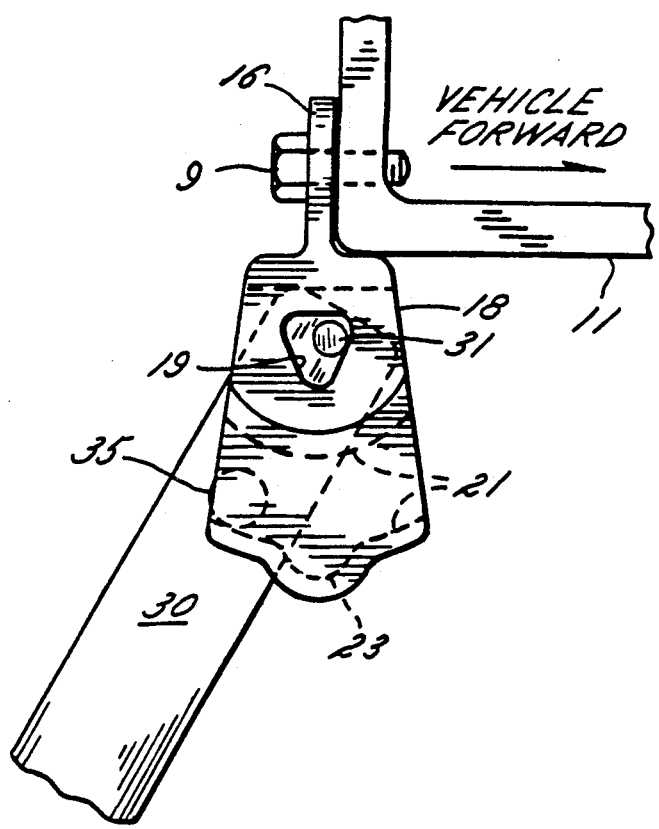
FIG. 5 is a fragmentary side elevation view of the invention mounted on a vehicle in a rearward swinging position.

As seen in FIG. 5, the vehicle upon which truck step 10 is mounted is moving forwardly so that upon striking an obstacle the step can swing rearwardly to bypass the obstruction. As indicated above, once the step assembly 30 is unseated by disengaging the rotational guide pins 34, 35 from the stability detents 23, 24, the step assembly 30 will freely rotate about the axis of rotation provided by the horizontal axial cross member 31. While rotating, the rotational guide pins 34, 35 track within the rotational guide channels 21, 22 as step platform 30 rotates to present an out of the way platform.

Figure 6:
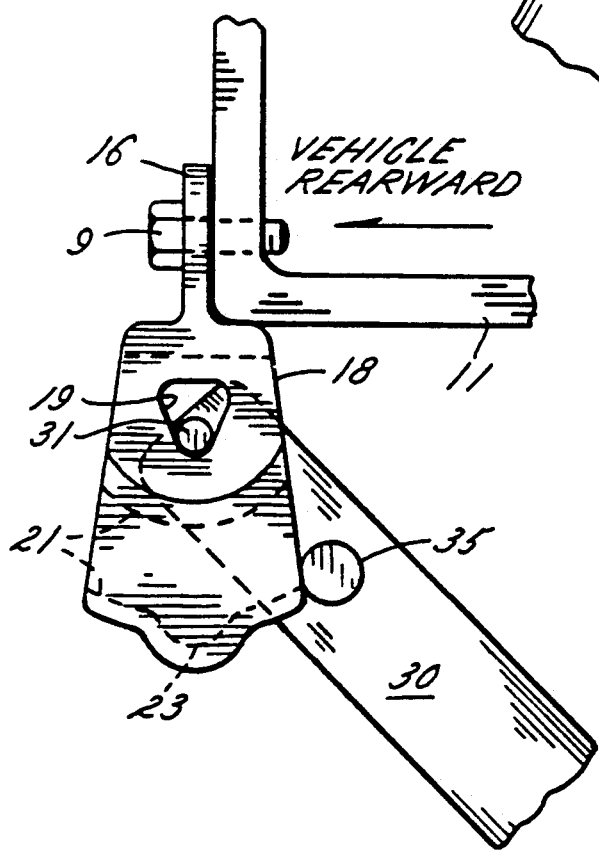
FIG. 6 is a fragmentary side elevation view of the invention mounted on a vehicle in a forwardly swinging position.

FIG. 6 illustrates the action of the step assembly 30 as addressed above when the vehicle upon which the truck step 10 is mounted is moving rearwardly as when backing up. Here, the step platform moves out of the way in the opposite direction from that of FIG. 5.

It should be noted that when the platform is rotated in either direction such that the guide pins 34, 35 clear the outer ends of the guide channels, 21, 22 the platform is held in the rotated position since the cross rod 31 ends can move downwardly in the cam-shaped aperatures 19, 20. Thus, the cam-shaped aperatures allow the cross rod ends to shift the axis of rotation of the step assembly such that it is free to rotate when the guide pins are lifted out of the channel V portions 23, 24 which otherwise hold the pins and prevent rotation of the step assembly 30.

I claim as my invention:

1. For use in connection with a vehicle body structure, step means attachable to said vehicle body structure comprising:

a frame member having means for securing to the vehicle body structure, said frame member including an inverted U-shape bracket having spaced apart legs which are disposed in substantially vertical parallel planes, each leg having a substantially triangular aperture, one point of the triangular aperture extending downward with respect to the leg, and at least one leg having a V-shaped guide channel having a detent; and a step member comprising a platform and substantially parallel arms coupled to opposite sides of the platform, each said arm having an axial pin and at least one arm having a guide pin, said pins being disposed such that the guide pins are movable in the guide channels and the axial pins are received in the apertures and define a rotational axis of the step member, said axial pins being movable in the apertures to shift the rotational axis of the step member, said axis having a first position such that the axial pins are seated in the downwardly extending points of the apertures and the guide pins are engaged in the detent under the force of gravity and the platform is rigidly coupled to the frame member so that the platform may be used as a step, and a second position such that the axial pins are not seated in the downwardly extending points of the apertures and the guide pins are movable in the guide channel whereby the step member may be swung forwardly or rearwardly upon contact with an obstruction.

2. A step means as claimed in claim 1, wherein the platform is rigidly coupled to the frame member in a forward position or a rearward position when the axial pins are seated in the downwardly extending points of the apertures and the guide pins extend beyond the guide channels, such that the guide pins are held in position by gravity and the platform may be used as a step.

3. A vehicle step means as claimed in claim 2 wherein the platform is an expanded metal structure.

4. A vehicle step means as claimed in claim 2 wherein said mounting means includes a pair of ears adapted to be fixedly attached to the vehicle structure.

5. A vehicle step means as claimed in claim 2 wherein said first position of the axis is downwardly and the second position is upwardly with respect to the frame.

* * * * *